United States Patent
Fujiwara et al.

(10) Patent No.: US 7,469,530 B2
(45) Date of Patent: Dec. 30, 2008

(54) FUEL CUT CONTROL APPARATUS OF INTERNAL COMBUSTION ENGINE

(75) Inventors: Takahiko Fujiwara, Susono (JP); Kunihiko Nakata, Mishima (JP); Hiroki Ichinose, Fujinomiya (JP); Atsunori Hirata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/061,879

(22) Filed: Feb. 22, 2005

(65) Prior Publication Data

US 2005/0193722 A1    Sep. 8, 2005

(30) Foreign Application Priority Data

Mar. 3, 2004  (JP)  ............... 2004-058619

(51) Int. Cl.
*F01N 3/00*    (2006.01)
(52) U.S. Cl. .............. 60/285; 60/276; 60/277; 123/198 F; 123/481
(58) Field of Classification Search ........ 60/276, 60/277, 285, 299; 123/325, 481, 198 F; 701/109
See application file for complete search history.

(56) References Cited

U.S. PATENT DOCUMENTS

| | | | | |
|---|---|---|---|---|
| 5,228,286 A | * | 7/1993 | Demura ............... | 60/277 |
| 5,570,575 A | * | 11/1996 | Sato et al. ............ | 60/277 |
| 5,622,048 A | * | 4/1997 | Aoyama et al. ....... | 60/277 |
| 5,661,972 A | * | 9/1997 | Katoh et al. .......... | 60/285 |
| 5,784,880 A | * | 7/1998 | Toshiro et al. ........ | 60/277 |
| 6,148,611 A | * | 11/2000 | Sato .................... | 60/274 |
| 6,405,527 B2 | * | 6/2002 | Suzuki et al. ......... | 60/285 |
| 6,594,987 B2 | * | 7/2003 | Uranishi .............. | 60/277 |

(Continued)

FOREIGN PATENT DOCUMENTS

JP    8-144814    6/1996

(Continued)

*Primary Examiner*—Thomas E Denion
*Assistant Examiner*—Diem Tran
(74) *Attorney, Agent, or Firm*—Oliff & Berridge, PLC (57) ABSTRACT

The exhaust gas purifying catalysts sometimes generate $H_2S$ which emits exhaust odor under reducing atmosphere. However, in the ordinary air-fuel ratio control, it takes much time to establish sufficient oxygen atmosphere for suppressing $H_2S$ emission when the maximum oxygen storage amount which the exhaust gas purifying catalyst can store is large. Thus, the fuel cut control apparatus of an internal combustion engine executes fuel cut to bring oxygen in the exhaust gas into an excessive state when the maximum oxygen storage amount is a predetermined amount or more. As a result, sufficient oxygen can be stored in the exhaust gas purifying catalyst. Even when the maximum oxygen storage amount of the exhaust gas purifying catalyst is smaller than the predetermined amount, if the temperature of the exhaust gas purifying catalyst is lower than predetermined temperature, fuel cut is executed. In this case, influence which is given to deterioration of the catalysts is small even if the fuel cut is executed and the inside of the catalysts is under the oxygen atmosphere. On the other hand, if the temperature of the exhaust gas purifying catalyst is the predetermined temperature or higher, the fuel cut is not executed. Since the deterioration of the catalyst is promoted when the catalyst is under the oxygen atmosphere at high temperature, priority is given to prevention of deterioration of the exhaust gas purifying catalyst.

5 Claims, 5 Drawing Sheets

U.S. PATENT DOCUMENTS

| | | | |
|---|---|---|---|
| 6,622,479 B2 * | 9/2003 | Kakuyama et al. | 60/285 |
| 6,715,281 B2 * | 4/2004 | Zhu | 60/276 |
| 6,850,165 B2 * | 2/2005 | Sakanushi et al. | 340/633 |
| 6,901,741 B2 * | 6/2005 | Kobayashi et al. | 60/274 |
| 6,901,744 B2 * | 6/2005 | Kako et al. | 60/285 |
| 7,032,374 B2 * | 4/2006 | Okazaki et al. | 60/285 |

FOREIGN PATENT DOCUMENTS

| | | |
|---|---|---|
| JP | 2000-130221 | 5/2000 |
| JP | 2000-204937 | 7/2000 |
| JP | A-2001-227383 | 8/2001 |
| JP | 2002-327641 | 11/2002 |
| JP | A-2003-041991 | 2/2003 |
| JP | 2003-065127 | 3/2003 |
| JP | A-2003-207043 | 7/2003 |

* cited by examiner

FUEL CUT CONTROL APPARATUS OF INTERNAL COMBUSTION ENGINE

BACKGROUND OF THE INVENTION

1. Field of the Invention

The present invention relates to a fuel cut control apparatus of an internal combustion engine.

2. Description of the Related Art

In an exhaust gas purifying catalyst (hereinafter, also simply called "catalyst") such as a three-way catalyst which is placed in an exhaust passage of a vehicle, sulfur (S) is adsorbed by ceria ($CeO_2$) in the catalyst when an air-fuel ratio is lean, and when it is rich, the sulfur is desorbed. It is known that the desorbed sulfur oxide ($SO_2$) is reduced and hydrogen sulfide ($H_2S$) is generated. The $H_2S$ has such an odor that gives a discomfort to a driver (hereinafter, called "exhaust odor").

As a control technique concerning suppression of $H_2S$, for example, Japanese Patent Application Laid-Open under No. 2003-65127 discloses the art of suppressing the generation of the above-described $H_2S$ by controlling the air-fuel ratio to be lean (namely, to establish oxidation atmosphere with excessive oxygen) when the vehicle is idling and the temperature of the catalyst is lower than a predetermined temperature. Other than this, Japanese Patent Application Laid-Open under No. 2000-204937 discloses the control technique concerning suppression of $H_2S$, and Japanese Patent Application Laid-Open under No. 2002-327641 discloses the technique concerning the control of oxygen storage amount of a catalyst.

In a fuel injection amount control for an internal combustion engine, fuel cut which temporarily stops fuel injection is conventionally performed. For example, when the throttle valve is completely closed and the number of engine revolution is equal to or higher than a predetermined number (namely, when the internal combustion engine is in a decelerating operation state), it is determined that the driving state is in the decelerating operation state requiring no fuel supply, and fuel injection is stopped, thus performing fuel cut to enhance fuel consumption efficiency, purify exhaust gas and prevent heating of the exhaust gas purifying catalyst.

The execution of such fuel cut sometimes causes deterioration of the exhaust gas purifying catalyst provided in the exhaust system. Namely, the fuel cut induces oxidation atmosphere in the exhaust system, and it is found out that, if the fuel cut is executed in the state in which the temperature of the catalyst is high, the peripheral area of the exhaust purifying catalyst becomes the oxidation atmosphere at high temperature, which causes the catalyst to deteriorate early. Thus, for example, Japanese Patent Application Laid-Open under No. 8-144814 discloses the art concerning the fuel cut control which stops execution of the fuel cut when the temperature of the exhaust gas purifying catalyst is high even if the internal combustion engine is in the decelerating operation state.

However, in the fuel cut execution stopping control as described above, there is the problem that sufficient oxygen cannot be supplied to the catalyst if the execution of the fuel cut is stopped when the oxygen storage amount of the exhaust gas purifying catalyst is small, and therefore the inside of the catalyst becomes the reducing atmosphere thereafter, which sometimes causes exhaust odor due to $H_2S$.

SUMMARY OF THE INVENTION

The present invention is made to solve the above problems, and its object is to provide a fuel cut control apparatus of an internal combustion engine which makes it possible to properly perform fuel cut with preventing deterioration of an exhaust gas purifying catalyst and suppressing generation of exhaust odor.

In one aspect of the present invention, there is provided a fuel cut control apparatus of an internal combustion engine including an exhaust gas purifying catalyst provided in an exhaust passage of an internal combustion engine, an operational state determining unit which determines an operational state of the internal combustion engine, a maximum oxygen storage amount obtaining unit which obtains a maximum oxygen storage amount of the exhaust gas purifying catalyst, and a fuel cut unit which performs fuel cut by cutting fuel to be supplied to the internal combustion engine when the operational state is a decelerating operation state, wherein the fuel cut unit performs the fuel cut when the maximum oxygen storage amount is equal to or larger than a predetermined amount.

The above-described fuel cut control apparatus of an internal combustion engine is provided in a vehicle or the like. The fuel cut is performed to enhance fuel consumption efficiency and purify the exhaust gas discharged from the internal combustion engine by stopping unnecessary fuel supply when the internal combustion engine is in a decelerating operation state. In the fuel cut control apparatus of an internal combustion engine, an exhaust gas purifying catalyst which purifies exhaust gas is provided in the exhaust passage of the internal combustion engine. The exhaust gas purifying catalyst discharges $H_2S$ by reduction of $SO_2$ in reducing atmosphere. Thus, the fuel cut control apparatus of an internal combustion engine includes the maximum oxygen storage amount obtaining unit which obtains the maximum oxygen storage amount of the exhaust gas purifying catalyst, and when the maximum oxygen storage amount is equal to or larger than a predetermined amount, the fuel cut control apparatus executes fuel cut and brings oxygen in the exhaust gas into an excessive state. As a result, sufficient oxygen can be stored in the exhaust gas purifying catalyst. Therefore, the inside of the catalyst is made in the oxidation atmosphere, and $H_2S$ is not discharged.

In one mode, the above-described fuel cut control apparatus of an internal combustion engine may further include a catalyst temperature obtaining unit which obtains temperature of the exhaust gas purifying catalyst, and the fuel cut unit performs the fuel cut when the maximum oxygen storage amount is smaller than the predetermined amount and the temperature of the exhaust gas purifying catalyst is lower than a predetermined amount, and the fuel cut unit does not perform fuel cut when the maximum oxygen storage amount is smaller than the predetermined amount and the temperature of the exhaust gas purifying catalyst is equal to or higher than the predetermined temperature.

In this mode, the fuel cut control apparatus of an internal combustion engine executes the fuel cut if the temperature of the exhaust gas purifying catalyst is lower than the predetermined temperature even though the maximum oxygen storage amount of the exhaust gas purifying catalyst is smaller than the predetermined amount. It is understood that the exhaust gas purifying catalyst is in the state of comparatively large deterioration degree when the maximum oxygen storage amount is smaller than the predetermined value, but the deterioration is not rapidly promoted because the temperature of the catalyst is not high. Accordingly, influence on the deterioration of the catalyst is small even if the fuel cut is executed and the inside of the catalyst is brought into oxidation atmosphere, and therefore fuel cut is performed. This brings the inside of the catalyst into oxidation atmosphere, and suppresses the discharge of exhaust odor. On the other hand, if the temperature of the exhaust gas purifying catalyst is equal to or higher than the predetermined temperature, fuel cut is not executed. If the catalyst is brought into oxidation atmosphere when the catalyst is at high temperature, deterioration of the catalyst is promoted. Therefore, the fuel cut is not performed and priority is given to prevention of deterioration of the exhaust gas purifying catalyst. From the above, the fuel cut control apparatus of an internal combustion engine can execute the fuel cut which realizes both suppression of generation of exhaust odor and prevention of deterioration of the catalyst.

In another mode of the above-described fuel cut control apparatus of an internal combustion engine, the fuel cut unit may perform the fuel cut so that an oxygen storage amount of the exhaust gas purifying catalyst does not exceed the maximum oxygen storage amount. Though the exhaust gas purifying catalyst sufficiently stores oxygen by the fuel cut, the fuel cut is sometimes continued. In this case, the fuel cut brings the exhaust gas purifying catalyst into oxidation atmosphere, and therefore there is the possibility of causing deterioration of the catalyst. Accordingly, the fuel cut control apparatus of an internal combustion engine performs fuel cut so that the oxygen storage amount of the exhaust gas purifying catalyst does not exceed the maximum oxygen storage amount. This can shorten the time in which the exhaust gas purifying catalyst is put under the oxidation atmosphere, and can prevent promotion of deterioration of the exhaust gas purifying catalyst.

In a preferred embodiment of the above-described fuel cut control apparatus, the fuel cut unit may include a target time calculating unit which calculates a target time, in which the fuel cut should be performed, based on the maximum oxygen storage amount of the exhaust gas purifying catalyst, and stops the fuel cut when the time in which the fuel cut is continued exceeds the target time. By performing fuel cut so as not to exceed the target time by using the target time thus calculated, the fuel cut control which realizes both suppression of generation of exhaust odor and prevention of deterioration of the catalyst can be executed, and the deterioration of the catalyst is not promoted by the fuel cut.

Preferably, the exhaust gas purifying catalyst includes a first exhaust gas purifying catalyst provided at an upstream side of the exhaust passage, and a second exhaust gas purifying catalyst provided at a downstream side of the exhaust passage, and the maximum oxygen storage amount obtaining unit obtains a maximum oxygen storage amount of the first exhaust gas purifying catalyst, and the temperature obtaining unit obtains temperature of the first exhaust gas purifying catalyst. The first exhaust gas purifying catalyst and the second exhaust gas purifying catalyst may be the catalysts capable of purifying $NO_x$ and the like in the exhaust gas.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

Preferred embodiments of the present invention will be explained hereinafter with reference to the attached drawings.

[Construction of Fuel Cut Control Apparatus]

Figure 1:
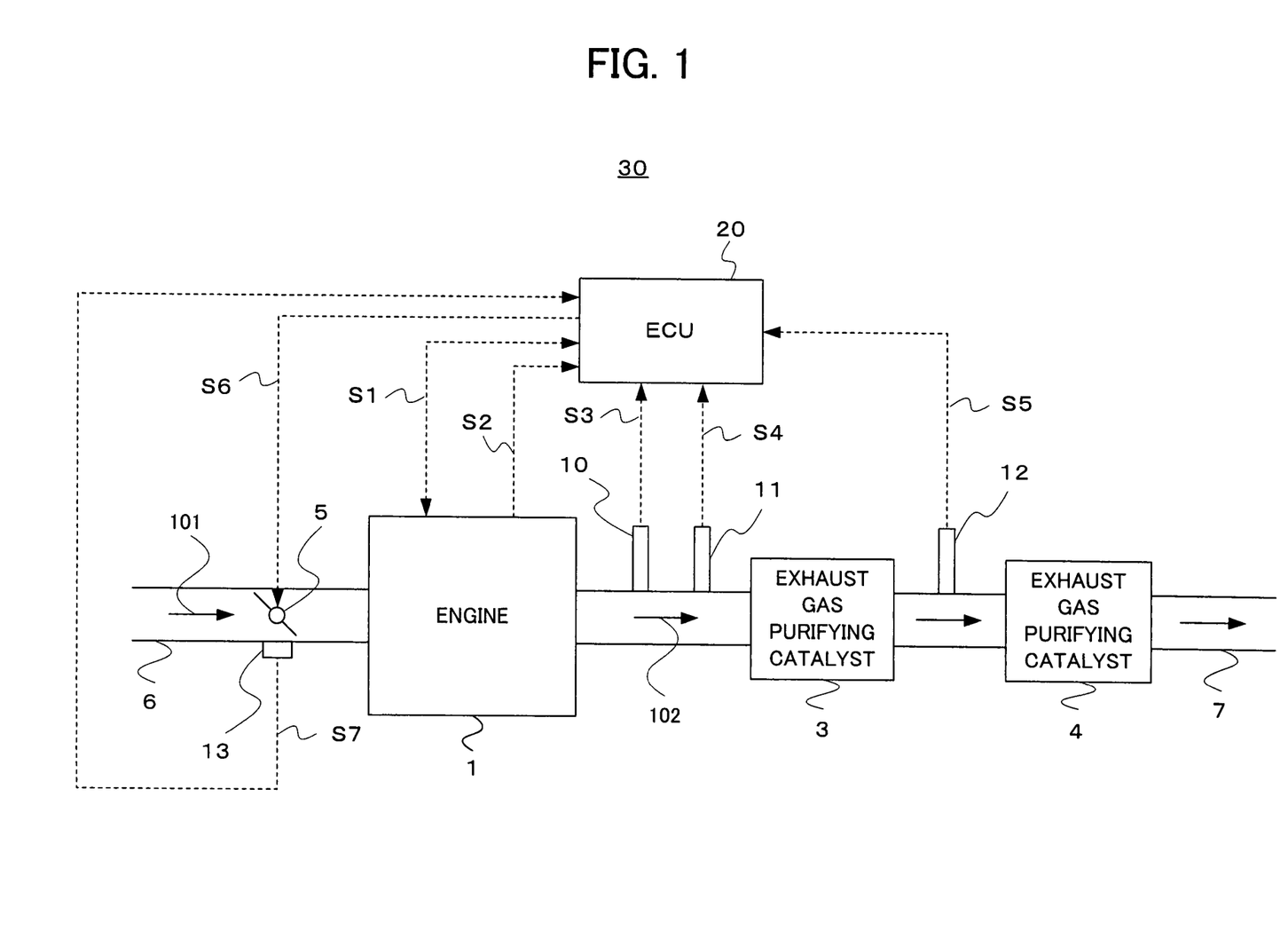
FIG. 1 is a block diagram showing a schematic construction of a fuel cut control apparatus according to embodiments of the present invention.

FIG. 1 is a schematic block diagram showing a control system 30 of an internal combustion engine to which a fuel cut control apparatus of an internal combustion engine according to one embodiment of the present invention is applied.

In FIG. 1, the control system 30 includes an engine 1, a throttle valve 5, an intake passage 6, an exhaust passage 7, an exhaust gas purifying catalyst 3, an exhaust gas purifying catalyst 4, an ECU (Engine Control Unit) 20, an air-fuel ratio sensor 10, an exhaust gas temperature sensor 11, an oxygen concentration sensor 12 and a throttle opening degree sensor 13. The control system 30 determines whether or not the fuel to be supplied to the engine 1 should be cut, and performs a control concerning fuel cut by using these components.

Intake air 101 is supplied to the engine 1 through the intake passage 6. The intake air 101 is adjusted in its flow rate by the throttle valve 5 placed in the intake passage 6 and introduced into the engine 1. Adjustment of the flow rate of the intake air 101 is performed by the ECU 20 which opens and closes the throttle valve 5 in accordance with a control signal S6. The engine 1 may be an internal combustion engine such as, for example, a gasoline engine and a diesel engine.

An exhaust gas 102, which is discharged from the engine 1, flows through the exhaust passage 7 and is emitted to an outside. The exhaust passage 7 is provided with the exhaust gas purifying catalyst 3 at an upstream side and with the exhaust gas purifying catalyst 4 at a downstream side. The exhaust gas purifying catalyst 3 functions as a first exhaust gas purifying catalyst and the exhaust gas purifying catalyst 4 functions as a second exhaust gas purifying catalyst. For these exhaust gas purifying catalysts 3 and 4, a three-way catalyst can be used.

The above-described exhaust gas purifying catalysts 3 and 4 can store oxygen in the exhaust gas 102. When carbon monoxide (CO) and hydrocarbon (HC) exist in the exhaust gas 102, the exhaust gas 102 is purified by oxidizing CO and HC by using the stored oxygen. Further, in the exhaust gas purifying catalysts 3 and 4, sulfur (S) is adsorbed by ceria ($CeO_2$) in the catalysts and the sulfur (S) is desorbed when the air-fuel ratio is rich.

The air-fuel ratio sensor 10, the exhaust gas temperature sensor 11 and the oxygen concentration sensor 12 are placed in the exhaust passage 7. The air-fuel ratio sensor 10 outputs a signal S3 which corresponds to an air-fuel ratio (A/F) of the exhaust gas 102 discharged from the engine 1, to the ECU 20. The exhaust gas temperature sensor 11 outputs a signal S4 corresponding to the temperature of the exhaust gas 102 to the ECU 20. The oxygen concentration sensor 12 outputs a signal S5 corresponding to the oxygen concentration in the exhaust gas 102 to the ECU 20.

The ECU 20 mainly and collectively controls the operation of the engine 1 and the like based on the operational state of the engine 1 and the outputs of the above-described various kinds of sensors. The ECU 20 is constructed by a CPU, a ROM, a RAM, an A/D converter, an input and output interface and the like not shown.

The ECU 20 functions as operational state determining unit which determines the operational state of the engine 1 based on a signal S2 corresponding to the number of engine revolution of the engine 1, a signal S7 corresponding to the opening degree of the throttle valve 5 supplied from the throttle opening degree sensor 13 and the like. The ECU 20 also functions as maximum oxygen storage amount obtaining unit which obtains the maximum oxygen storage amount (Cmax), which the exhaust gas purifying catalyst 3 can store, based on the output signal S3 from the air-fuel ratio sensor 10 and the output signal S5 from the oxygen concentration sensor 12. Further, the ECU 20 functions as catalyst temperature obtaining unit which obtains the temperature of the exhaust gas purifying catalyst 3 based on the output signal S4 from the exhaust gas temperature sensor 11. In the example shown in FIG. 1, the ECU 20 obtains the temperature of the exhaust gas purifying catalyst 3 by using the temperature of the exhaust 102, but the catalyst temperature may be obtained by directly providing a temperature sensor in the exhaust gas purifying catalyst 3. The ECU 20 may obtain the catalyst temperature from the operational state of the engine 1.

In this embodiment, the ECU 20 functions as fuel cut unit which determines whether or not the fuel to be supplied to the engine 1 should be cut, based on the operational state of the above-described engine 1, the maximum oxygen storage amount (Cmax) of the exhaust gas purifying catalyst 3, the temperature of the exhaust gas purifying catalyst 3 and the like, and controls the fuel cut.

The maximum oxygen storage amount Cmax can be obtained by the method shown as follows, for example. When the engine 1 is operated substantially steadily in a partial load region or the like, a rich control for making the air-fuel ratio of the engine 1 rich is performed. When the output of the oxygen concentration sensor 12 is brought into the rich side by discharging oxygen from the exhaust gas purifying catalyst 3, it can be determined that the atmosphere in the exhaust passage 7 becomes rich. Next, a lean control for making the air-fuel ratio of the engine 1 lean is performed to allow the exhaust gas purifying catalyst 3 to store oxygen up to the maximum oxygen storage amount Cmax. In this case, it can be determined that the oxygen storage amount of the exhaust gas purifying catalyst 3 becomes the maximum oxygen storage amount Cmax when the output of the oxygen concentration sensor 12 comes to the lean side. The maximum oxygen storage amount Cmax can be obtained by multiplying the amount of air, which is taken into the engine 1 from the time when the lean control is performed for the engine 1 until the output of the oxygen concentration sensor 11 becomes lean, and a difference (excess amount of oxygen) between the air-fuel ratio detected by the air-fuel ratio sensor 10 during lean control and the stoichiometric air-fuel ratio, and accumulating the values obtained by the multiplication.

[Fuel Cut Processing]

Fuel cut processing according to the embodiments which the aforementioned control system 30 performs will be explained hereinafter.

First Embodiment

First, fuel cut processing according to a first embodiment of the present invention will be explained with reference to a flow chart in FIG. 4. The fuel cut processing according to the first embodiment intends to perform fuel cut while suppressing generation of $H_2S$ causing exhaust odor and preventing deterioration of the exhaust gas purifying catalyst. The fuel cut processing is executed by the ECU 20 controlling a fuel injection valve (not shown) in the engine 1 and making the fuel injection rate zero. The fuel cut processing explained below is repeatedly carried out at predetermined cycles during operation of the engine 1.

The ECU 20 firstly determines whether a present number of engine revolution NE is equal to or higher than a predetermined number of engine revolution NE0 or not in step S11. The ECU 20 obtains the number of engine revolution NE from the signal S2 outputted from the engine 1. The predetermined number of engine revolution NE0 is stored in a memory or the like (not shown) in the ECU 20. The predetermined number of engine revolution NE0 maybe set at, for example, about 1000 rpm. When the number of engine revolution NE is equal to or higher than the predetermined number of engine revolution NE0 (step S11; Yes), the processing goes to step S12.

In step S12, the ECU 20 determines whether an opening degree TA of the throttle valve 5 is zero or not. The ECU 20 obtains the opening degree TA of the throttle valve 5 according to the signal S7 outputted from the throttle opening degree sensor 13. Namely, the ECU 20 performs the processing in step S11 and step S12, and thereby determines whether the engine 1 is in the decelerating operation state or not (whether the fuel cut condition is satisfied or not). Execution of the fuel cut when the engine 1 is in the decelerating operation state leads to enhancement in fuel consumption efficiency and purification of the exhaust gas. Accordingly, when the number of engine revolution NE is equal to or higher than the predetermined number of engine revolution NE0 (step S11; Yes) and the opening degree of the throttle valve 5 is zero (step S12; Yes), the ECU 20 performs the processing from step S13 onward for further determining whether the fuel cut should be performed or not.

On the other hand, when the number of engine revolution NE is lower than the predetermined number of engine revolution NE0 (step S11; No), or when the opening degree TA of the throttle valve 5 is not 0 (step S12; No), the engine 1 is not performing a decelerating operation (the fuel cut condition is not satisfied), and therefore the processing goes out of this flow without performing fuel cut.

In step S13, the ECU 20 obtains the maximum oxygen storage amount Cmax of the exhaust gas purifying catalyst 3, and determines whether or not Cmax is equal to or larger than a predetermined amount C0. To explain the processing performed in step S13 in detail, the explanation will be carried forward with reference to FIG. 2 and FIG. 3.

Figure 2:
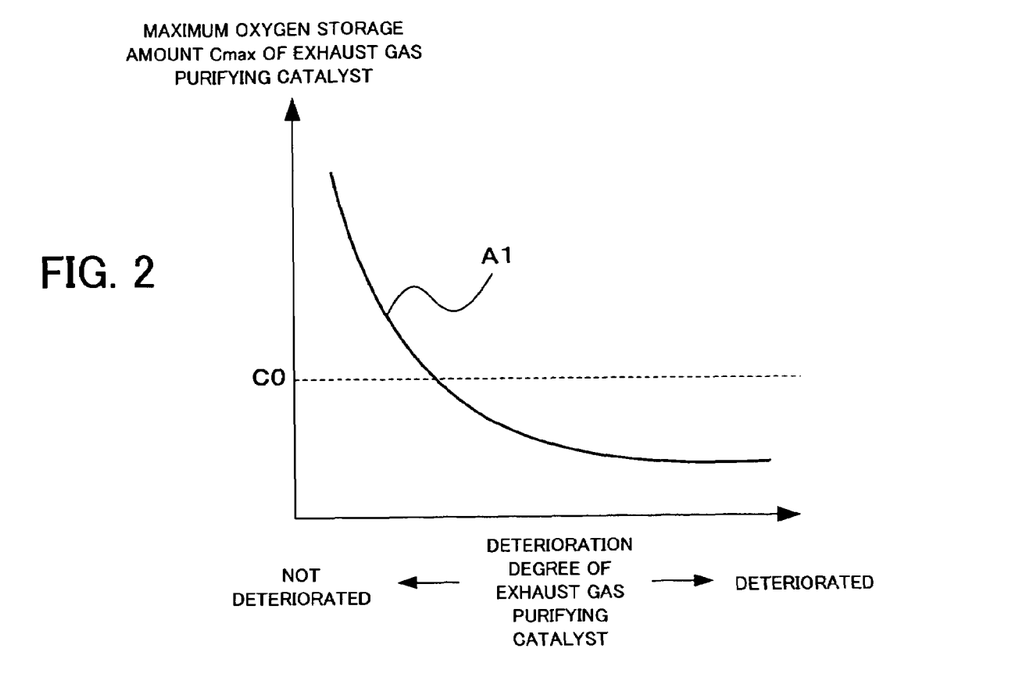
FIG. 2 is a graph showing one example of relationship between a deterioration degree of a catalyst and a maximum oxygen storage amount.

FIG. 2 is a graph showing relationship between a deterioration degree of the exhaust gas purifying catalyst 3 and the maximum oxygen storage amount Cmax of the exhaust gas purifying catalyst 3. In FIG. 2, the maximum oxygen storage amount Cmax of the exhaust gas purifying catalyst 3 is shown in the vertical axis, and the deterioration degree of the exhaust gas purifying catalyst 3 is shown in the horizontal axis. In the horizontal axis, it is shown that the degree of deterioration of the exhaust gas purifying catalyst 3 (hereinafter, simply called "deterioration degree") is larger as it advances to the right. The exhaust gas purifying catalyst 3 has the characteristic substantially shown by the characteristic curve A1. From FIG. 2, it is understood that the larger the deterioration degree of the exhaust gas purifying catalyst 3 is, the smaller the maximum oxygen storage amount Cmax is. Namely, it is understood that if the maximum oxygen storage amount Cmax is large, the deterioration degree of the exhaust gas purifying catalyst 3 is small. In FIG. 2, the amount shown by the reference numeral C0 will be used as "the predetermined amount" of the maximum oxygen storage amount Cmax hereinafter. When the maximum oxygen storage amount Cmax is equal or larger than the predetermined amount C0, the fuel cut is performed, and when the maximum oxygen storage amount Cmax is smaller than the predetermined amount C0, the fuel cut is not performed. The details will be described later.

Figure 3:
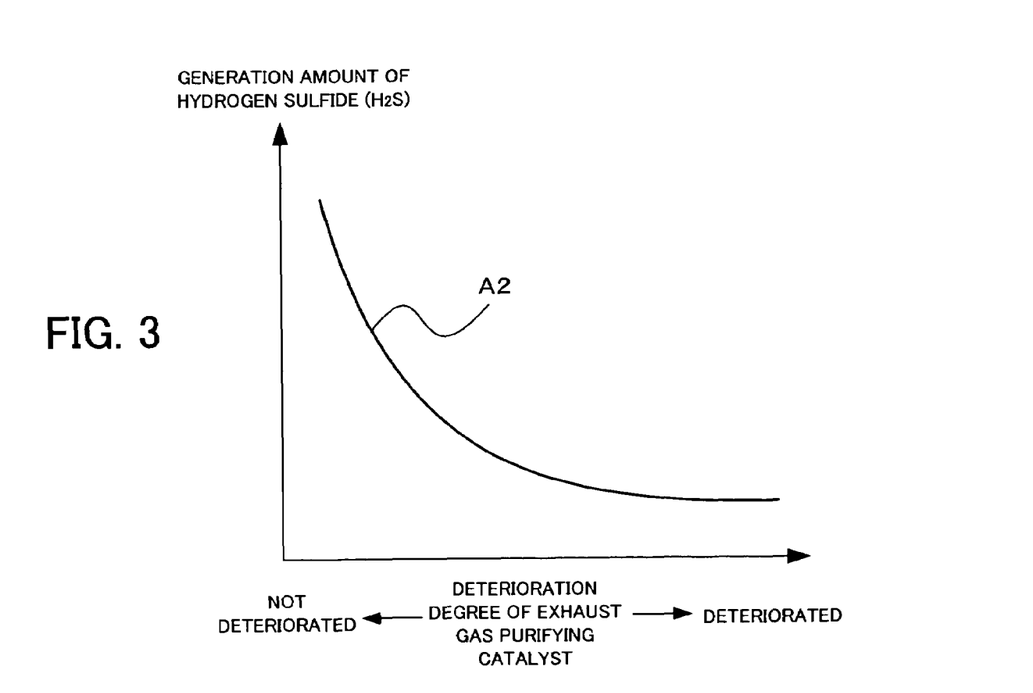
FIG. 3 is a graph showing one example of relationship between the deterioration degree of the catalyst and a generation amount of $H_2S$.

Next, the relationship between the deterioration degree of the exhaust gas purifying catalyst 3 and the amount of $H_2S$ which the exhaust gas purifying catalyst 3 generates will be explained by using FIG. 3. In FIG. 3, the generation amount of $H_2S$ is shown in the vertical axis, and the deterioration degree of the exhaust gas purifying catalyst 3 is shown in the horizontal axis. The exhaust gas purifying catalyst 3 has the characteristic substantially shown by the characteristic curve A2. From this, it is understood that the smaller the deterioration degree of the exhaust gas purifying catalyst 3 is, the larger the generating amount of $H_2S$ is, and that the larger the deterioration degree is, the smaller the amount of generating $H_2S$ is. This is because the exhaust gas purifying catalyst 3 has high sulfur occlusion ability if the exhaust gas purifying catalyst 3 is not deteriorated.

Returning to FIG. 4, step S13 will be explained. The oxygen flowing through the exhaust passage 7 is stored until the exhaust gas purifying catalyst 3 at the upstream side reaches the vicinity of the maximum oxygen storage amount Cmax, and thereafter, the oxygen reaches the exhaust gas purifying catalyst 4 at the downstream side. It is also possible to store oxygen in the exhaust gas purifying catalysts 3 and 4 by controlling the air-fuel ratio to be in the lean range according to the ordinary air-fuel ratio control. However, if the maximum oxygen storage amount Cmax of the exhaust gas purifying catalyst 3 is large, the oxygen is preferentially stored in the exhaust gas purifying catalyst 3 at the upstream side first, and therefore much time is taken until the exhaust gas purifying catalyst 4 stores sufficient oxygen. Therefore, if the maximum oxygen storage amount Cmax of the exhaust gas purifying catalyst 3 is equal to or larger than the predetermined amount C0 (step S13; Yes), the ECU 20 executes fuel cut in step S15 in order to increase the oxygen in the exhaust gas more than that at the time of the ordinary air-fuel ratio control. Thereby, the oxygen in the exhaust gas is in the excessive state. Therefore, the inside of the exhaust gas purifying catalyst 4 located at the downstream is under the sufficient oxygen atmosphere, and $H_2S$ is not discharged.

There is the fear that inside of the catalyst becomes the oxidation atmosphere by performing fuel cut and therefore the deterioration of the catalyst is promoted. However, it is recognized from FIG. 2 that, when the maximum oxygen storage amount Cmax is large, the catalyst is hardly deteriorated, and therefore the influence which the fuel cut gives on the deterioration of the catalyst is small.

On the other hand, when the maximum oxygen storage amount Cmax of the exhaust gas purifying catalyst 3 is smaller than the predetermined amount C0 (step S13; No), the processing goes to step S14. When the maximum oxygen storage amount Cmax of the exhaust gas purifying catalyst 3 is smaller than the predetermined amount C0, the oxygen flowing into the exhaust passage 7 is easily stored in the exhaust gas purifying catalyst 4 at the downstream side. Therefore, the air-fuel ratio is controlled to be in the lean range by the ordinary air-fuel ratio control, and thereby the inside of the exhaust gas purifying catalyst 4 at the downstream side can be brought into the oxidation atmosphere. Namely, the exhaust odor can be easily suppressed without executing the fuel cut. As shown in FIG. 3, the generation amount of $H_2S$ is small when the catalyst deteriorates, and therefore the problem of the exhaust odor is also comparatively small. Therefore, the processing goes to step S14 without performing fuel cut.

In step S14, the ECU 20 determines whether or not the temperature T of the exhaust gas purifying catalyst 3 is lower than the predetermined temperature T0 which promotes deterioration of the catalyst (for example, 800° C.). Since the maximum oxygen storage amount Cmax of the exhaust gas purifying catalyst 3 is small, it is understood from FIG. 2 that the deterioration degree of the catalyst is in the comparatively large state. Accordingly, when the temperature T of the exhaust gas purifying catalyst 3 is equal to or higher than the predetermined temperature T0 (step S14; No), the ECU 20 does not perform the fuel cut which further promotes deterioration of the exhaust gas purifying catalyst 3, and goes out of this flow. Namely, the ECU 20 gives priority to deterioration prevention of the exhaust gas purifying catalyst 3.

On the other hand, when the temperature T of the exhaust gas purifying catalyst 3 is lower than the predetermined temperature T0 (step S14; Yes), the flow proceeds to step S15, and the ECU 20 executes the fuel cut. It is understood that the deterioration degree of the exhaust gas purifying catalyst 3 is in the comparatively large state from the maximum oxygen storage amount Cmax, but the temperature of the catalyst is not high, and therefore the deterioration of the exhaust gas purifying catalyst is not rapidly promoted. Accordingly, even if the inside of the catalyst is brought into the oxidation atmosphere by executing fuel cut, the influence given to the deterioration of the catalyst is small. Therefore, fuel cut is performed in step S15. In this case, the maximum oxygen storage amount Cmax of the exhaust gas purifying catalyst 3. is comparatively small, and therefore the exhaust gas purifying catalyst 4 can store sufficient oxygen in a short time. As shown in FIG. 3, the maximum oxygen storage amount Cmax of the exhaust gas purifying catalyst 3 is smaller than the predetermined amount C0, and therefore the generation amount of $H_2S$ is comparatively small.

The ECU 20 executes fuel cut in step S15. The fuel cut is performed by the ECU 20 controlling the fuel injection valve provided in the engine 1 and stopping the fuel injection. When the execution of the fuel cut is finished, the processing goes to step S16.

In step S16, the ECU20 determines whether or not the number of engine revolution NE is lower than the predetermined number of engine revolution NE0, and whether or not the opening degree TA of the throttle valve 5 is larger than zero. Namely, the ECU 20 determines whether or not the engine 1 is in the decelerating operation state. This is because the operational state sometimes changes even during the execution of fuel cut.

If the engine 1 is in the decelerating operation state (step S16; No), the processing returns to step S15, and the fuel cut is continued.

On the other hand, if the engine 1 is not in the decelerating operation state (step S16; Yes), the processing goes to step S17. In step S17, the ECU 20 stops fuel cut because the engine 1 is not in the decelerating operation state. Then, the ECU 20 goes out of the flow.

As described above, in the fuel cut processing according to the first embodiment of the present invention, the fuel cut is executed in consideration of the maximum oxygen storage amount Cmax of the exhaust gas purifying catalyst 3 and the temperature T of the exhaust gas purifying catalyst 3. As a result, the fuel cut which realizes both suppression of generation of exhaust odor and prevention of deterioration of the catalyst can be carried out.

Second Embodiment

Fuel cut processing according to a second embodiment also performs fuel cut in consideration of the maximum oxygen storage amount Cmax of the exhaust gas purifying catalyst 3 and the temperature T of the exhaust gas purifying catalyst 3 as in the fuel cut processing according to the first embodiment. However, in the fuel cut processing according to the second embodiment, when the maximum oxygen storage amount Cmax of the exhaust gas purifying catalyst 3 is equal to or larger than the predetermined amount C0, the fuel cut is performed only in the necessary range for preventing the generation of the exhaust odor, and thereby the deterioration of the catalyst is prevented. The fuel cut processing according to the second embodiment will be explained hereinafter by using a flow chart shown in FIG. 5. The fuel cut processing is performed mainly by the ECU 20.

Figure 4:
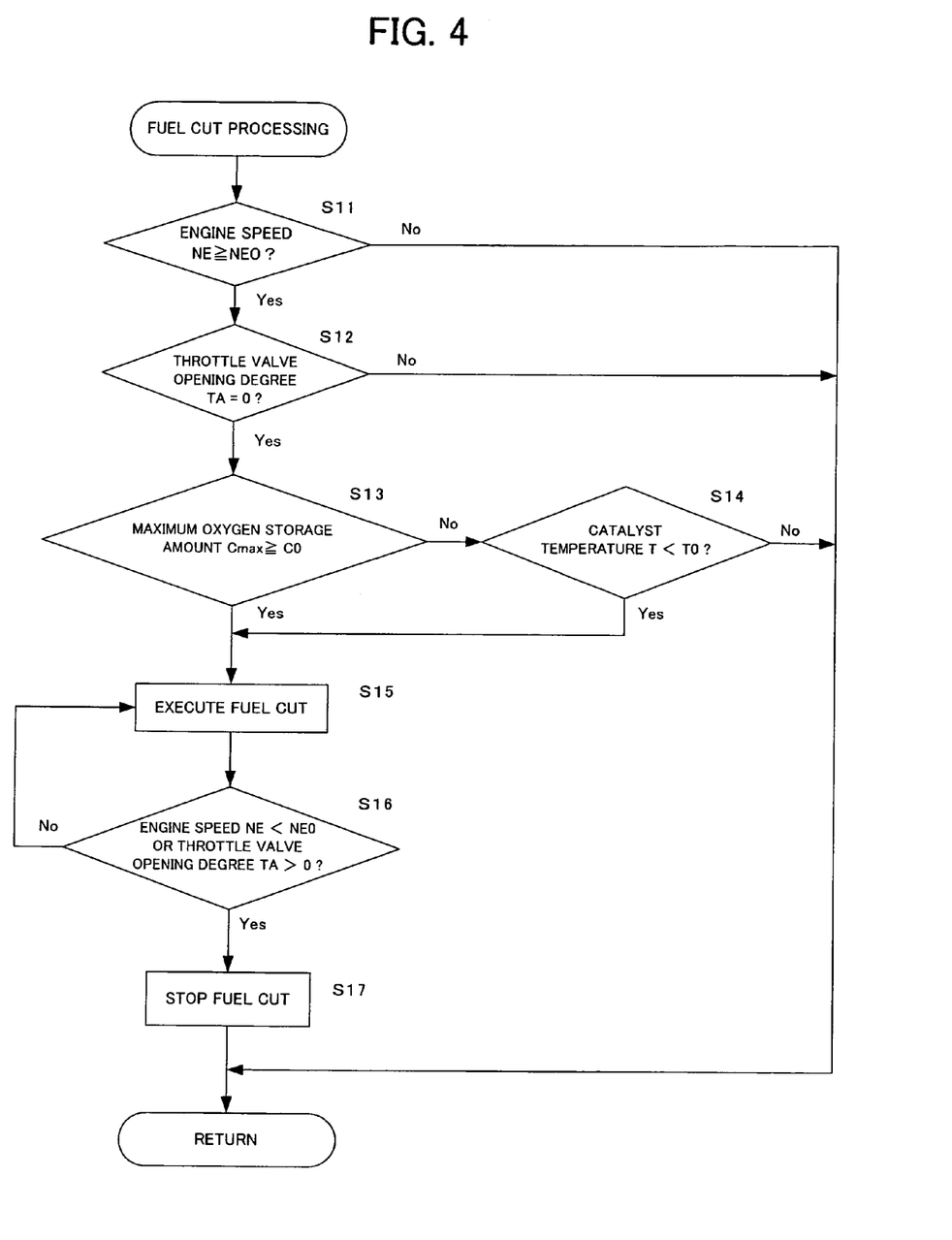
FIG. 4 is a flow chart showing fuel cut processing according to a first embodiment of the present invention.
Figure 5:
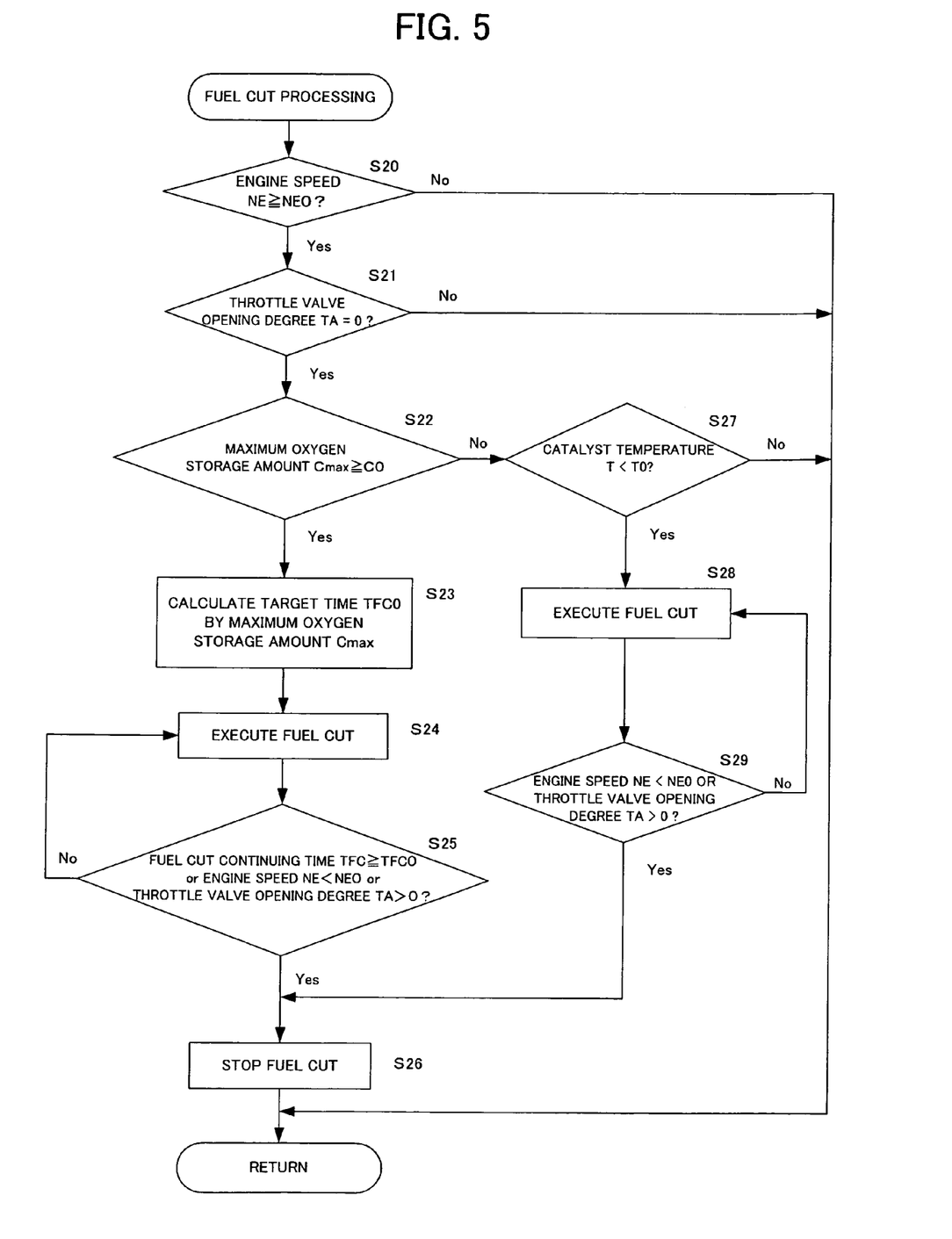
FIG. 5 is a flow chart showing fuel cut processing according to a second embodiment of the present invention.

The processing in step S20 and step S21 are the same as the processing in step S11 and step S12 shown in FIG. 4. Namely, the ECU 20 determines whether the engine 1 is in the decelerating operation state or not. When the engine 1 is in the decelerating operation state (step S20; Yes, and step S21; Yes), the processing goes to step S22. When the engine 1 is not in the decelerating operation state (step S20; No, or step S21; No), the ECU 20 does not perform the fuel cut and goes out of the flow.

In step S22, the ECU 20 obtains the maximum oxygen storage amount Cmax of the exhaust gas purifying catalyst 3, and determines whether or not the maximum oxygen storage amount Cmax is equal to or larger than the predetermined amount C0. When the maximum oxygen storage amount Cmax of the exhaust gas purifying catalyst 3 is equal to or larger than the predetermined amount C0, it takes a long time to establish sufficient oxygen atmosphere to suppress discharge of $H_2S$ by the ordinary air-fuel ratio control, and therefore the exhaust gas is brought into the oxidation atmosphere by performing the fuel cut. Therefore, when the maximum oxygen storage amount Cmax is equal to or larger than the predetermined amount C0 (step S22; Yes), the ECU 20 executes the fuel cut and goes to the processing from the step S23 onward.

On the other hand, when the maximum oxygen storage amount Cmax of the exhaust gas purifying catalyst 3 is smaller than the predetermined amount C0 (step S22; No), the ECU 20 determines that the inside of the exhaust gas purifying catalyst 3 and the exhaust gas purifying catalyst 4 can be brought into sufficient oxygen atmosphere to suppress the $H_2S$ discharge by the ordinary air-fuel ratio control, and the processing goes to step S27. In step S27, the ECU 20 determines whether or not the temperature T of the exhaust gas purifying catalyst 3 is lower than the predetermined temperature T0 which promotes deterioration of the catalyst. When the temperature T of the exhaust gas purifying catalyst 3 is equal to or higher than the predetermined temperature T0 (step S27; No), the ECU 20 does not perform fuel cut which further promotes deterioration of the exhaust gas purifying catalyst 3, and goes out of the flow.

On the other hand, when the temperature T of the exhaust gas purifying catalyst 3 is lower than the predetermined temperature T0 (step S27; Yes), the influence given to deterioration of the catalyst is small even if the fuel cut is executed, and the ECU 20 goes to step S28 and executes fuel cut. The processing in step S28, step S29 and step S26 is the same as the processing from step S15 to step S17 shown in FIG. 4. Namely, the ECU 20 determines whether or not the engine 1 is in the decelerating operation state again (step S29), and when it is in the decelerating operation state (step S29; No), the ECU 20 continues the fuel cut, and when the engine 1 is not in the decelerating operation state (step S29; Yes), the ECU 20 goes to step S26 and stops the fuel cut.

Next, the processing in step S23 will be explained. In step S23, the ECU 20 calculates a time TFC0 in which the fuel cut should be continued (hereinafter, called "target time") based on the maximum oxygen storage amount Cmax of the exhaust gas purifying catalyst 3. The reason why the processing of step S23 is performed will be explained. When the maximum oxygen storage amount Cmax of the exhaust gas purifying catalyst 3 is determined to be equal to or larger than the predetermined amount C0 in step S22 and fuel cut is executed, if the fuel cut is simply continued while the decelerating state of the vehicle continues (namely, the fuel cut condition is satisfied), the fuel cut is sometimes continued though the exhaust gas purifying catalyst 4 at the down stream side has already stored sufficient oxygen by the fuel cut. In this case, the fuel cut brings the catalyst into oxidation atmosphere, and therefore there is the possibility of causing deterioration of the catalyst (especially when the temperature T of the catalyst is equal to or higher than the predetermined temperature T0 at the time of fuel cut). Therefore, an appropriate time (namely, target time) in which the fuel cut should be continued for the purpose of preventing generation of exhaust odor is calculated based on the maximum oxygen storage amount Cmax of the exhaust gas purifying catalyst 3, so that the fuel cut is performed only for this target time. As a result, the time in which the exhaust gas purifying catalyst 3 is under oxidation atmosphere is made as short as possible within the range in which the generation of exhaust odor can be prevented, and thus deterioration of the exhaust gas purifying catalyst can be prevented.

It is preferable that the above-described target time TFC0 is calculated so that 80% or more of oxygen with respect to the obtained maximum oxygen storage amount Cmax is stored in the exhaust gas purifying catalyst 3 as a result that the fuel cut is continued for the time TFC0, for example. In this case, the ECU 20 functions as target time calculating unit which obtains the oxygen storage amount of the exhaust gas purifying catalyst 3 based on the output from various kinds of sensors such as the air-fuel ratio sensor 10 and calculates the target time TFC0 based on this oxygen storage amount and the maximum oxygen storage amount Cmax. The reason why 80% or so is preferable is that as for the remaining 20% or so, oxygen can be also stored in the exhaust gas purifying catalyst 3 at the upstream side by the ordinary air-fuel ratio control without performing fuel cut, and thereafter oxygen can be also stored in the exhaust gas purifying catalyst 4 at the downstream side by the ordinary air-fuel ratio control.

When the target time TFC0 is calculated in step S23, the processing goes to step S24, and the ECU 20 executes fuel cut. At this time, the ECU 20 counts the time in which the fuel cut is continued in step S24 and stores it in the memory or the like. When the above processing is finished, the processing goes to step S25.

In step S25, the ECU 20 performs determination concerning the three conditions: whether or not the time (hereinafter, "fuel cut continuing time") tfc in which the fuel cut is actually continued is equal to or longer than the target time TFC0; whether or not the number of engine revolution NE is lower than the predetermined number of engine revolution NE0; and whether or not the opening degree of the throttle valve 5 is larger than zero (namely, whether or not the engine 1 is in the decelerating operation state). When the engine 1 is not in the decelerating operation state, or when the time in which the fuel cut is continued exceeds the target time TFC0, the fuel cut should not be executed, and therefore the determination is periodically performed in step S25 even during execution of the fuel cut. Therefore, if any one of the conditions shown in step S25 is satisfied (step S25; Yes), the processing goes to step S26, and the ECU 20 stops the fuel cut. On the other hand, if all the conditions shown in step S25 are not satisfied (step S25; No), the processing returns to step S24, and the ECU 20 continues the fuel cut.

As described above, in the fuel cut processing according to the second embodiment, the fuel cut is executed in consideration of the maximum oxygen storage amount Cmax of the exhaust gas purifying catalyst 3 and the temperature T of the exhaust gas purifying catalyst 3, and therefore proper fuel cut which realizes both suppression of the generation of exhaust odor and prevention of deterioration of the catalyst can be executed. Further, the necessary target time of the fuel cut for suppressing exhaust odor is calculated based on the maximum oxygen storage amount Cmax of the exhaust gas purifying catalyst 3, and the fuel cut is executed only within the target time. Therefore, the fuel cut is not continued more than required for suppression of the exhaust odor, and the deterioration of the catalyst can be effectively prevented.

The above-described example is directed to the example in which the ECU 20 calculates the target time, in which the fuel cut should be continued, based on the maximum oxygen storage amount Cmax of the exhaust gas purifying catalyst 3, but the present invention is not limited to this. For example, a target air amount to be supplied may be calculated based on the maximum oxygen storage amount Cmax of the exhaust gas purifying catalyst 3 and the like, and the fuel cut may be stopped when the air amount which is supplied at the time of the fuel cut exceeds the target air amount.

MODIFICATION EXAMPLE

A modification example concerning the fuel cut processing of the above-described second embodiment will be explained. The fuel cut processing according to the modification example will be shown in FIG. 6.

Figure 6:
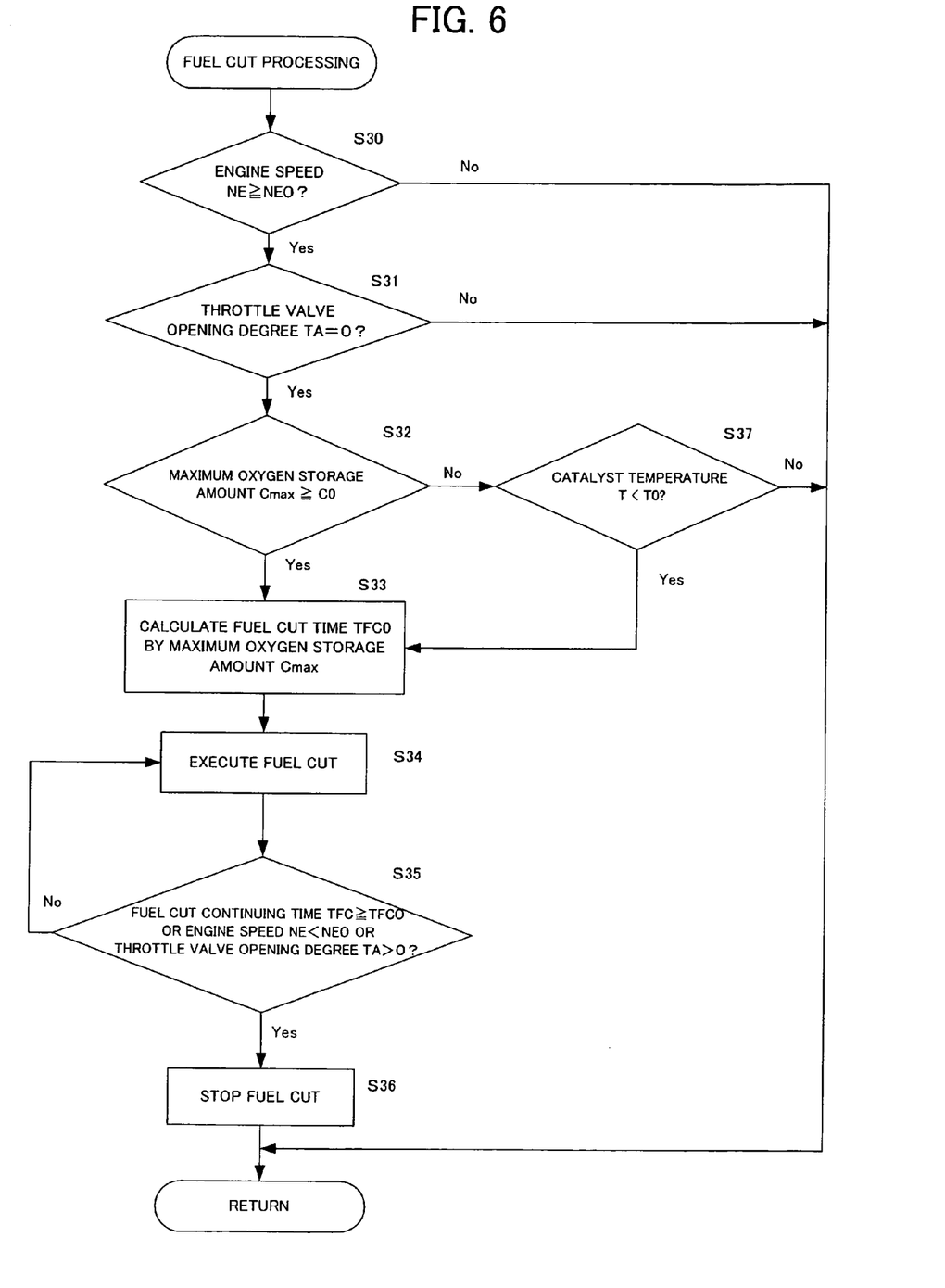
FIG. 6 is a flow chart showing fuel cut processing according to a modification example of the second embodiment.

FIG. 5 showing the fuel cut processing according to the second embodiment differs from FIG. 6 showing the fuel cut processing according to the modification example only in the processing of the case in which the temperature T of the exhaust gas purifying catalyst 3 is lower than the predetermined temperature T0 (step S27; Yes and step S37; Yes). In the second embodiment, the target time TFC0 in which the fuel cut is continued is calculated only when the maximum oxygen storage amount Cmax of the exhaust gas purifying catalyst 3 is equal to or larger than the predetermined amount C0 (step S22; Yes), but in the modification example, the ECU 20 also calculates the target time TFC0 in step S33 when the temperature T of the exhaust gas purifying catalyst 3 is lower than the predetermined temperature T0 (step S37; Yes).

As a result, the fuel cut is also performed for the catalyst of which maximum oxygen storage amount Cmax is smaller than the predetermined amount C0, namely, the catalyst of which deterioration degree is comparatively large so as not to exceed the target time TFC0 which is minimally required to suppress the exhaust odor, and thereby deterioration of the catalyst can be effectively prevented.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2004-058619 filed on Mar. 3, 2004 including the specification, claims, drawings and summary is incorporated herein by reference in its entirety.

What is claimed is:

1. A fuel cut control apparatus of an internal combustion engine, comprising:
   an exhaust gas purifying catalyst provided in an exhaust passage of an internal combustion engine, the exhaust gas purifying catalyst comprising a first catalyst provided at an upstream side of the exhaust passage and a second catalyst provided downstream from the first catalyst;
   an operational state determining unit which determines an operational state of the internal combustion engine;
   a maximum oxygen storage amount obtaining unit which obtains a maximum oxygen storage amount of the first catalyst; and
   a fuel cut unit which performs fuel cut by cutting fuel to be supplied to the internal combustion engine when the operational state is a decelerating operation state and when the obtained maximum oxygen storage amount of the first catalyst is equal to or larger than a predetermined amount.

2. The fuel cut control apparatus of an internal combustion engine according to claim 1, further comprising:
   a catalyst temperature obtaining unit which obtains temperature of the exhaust gas purifying catalyst,
   wherein the fuel cut unit performs the fuel cut when the maximum oxygen storage amount is smaller than the predetermined amount and the temperature of the exhaust gas purifying catalyst is lower than a predetermined amount, and
   wherein the fuel cut unit does not perform the fuel cut when the maximum oxygen storage amount is smaller than the predetermined amount and the temperature of the exhaust gas purifying catalyst is equal to or higher than the predetermined temperature.

3. The fuel cut control apparatus of an internal combustion engine according to claim 1, wherein the fuel cut unit performs the fuel cut so that an oxygen storage amount of the second catalyst does not exceed the maximum oxygen storage amount.

4. The fuel cut control apparatus of an internal combustion engine according to claim 3, wherein the fuel cut unit includes a target time calculating unit which calculates a target time, in which the fuel cut should be performed, based on the maximum oxygen storage amount, and stops the fuel cut when the time in which the fuel cut is continued exceeds the target time.

5. The fuel cut control apparatus of an internal combustion engine according to claim 2, wherein the temperature obtaining unit obtains temperature of the first catalyst.

* * * * *